United States Patent [19]

Take

[11] Patent Number: 5,418,351

[45] Date of Patent: May 23, 1995

[54] AUTOMATIC COOLING APPARATUS

[75] Inventor: Masafumi Take, Tokyo, Japan

[73] Assignee: Seiko Instruments Inc., Tokyo, Japan

[21] Appl. No.: 184,562

[22] Filed: Jan. 21, 1994

[30] Foreign Application Priority Data

Jan. 21, 1993 [JP] Japan .................................. 5-008503

[51] Int. Cl.6 .............................................. H05B 1/02
[52] U.S. Cl. .................................... 219/497; 219/494;
219/501; 219/505; 323/237
[58] Field of Search ............... 219/497, 501, 505, 492,
219/485, 494; 323/235, 236, 903, 319, 237

[56] References Cited

U.S. PATENT DOCUMENTS

| | | | |
|---|---|---|---|
| 3,735,241 | 5/1973 | O'Sullivan | 323/24 |
| 4,260,947 | 4/1981 | Massey | 323/322 |
| 4,311,491 | 1/1982 | Bibbo et al. | 323/903 |
| 4,335,293 | 6/1982 | Kobayashi et al. | 219/10.55 B |
| 4,337,509 | 6/1982 | Omae et al. | 363/128 |
| 5,120,936 | 6/1992 | Shyu et al. | 219/497 |
| 5,216,567 | 1/1993 | Kontanzer | 361/3 |

Primary Examiner—Mark H. Paschall
Attorney, Agent, or Firm—Spensley Horn Jubas & Lubitz

[57] ABSTRACT

To eliminate pulsating current of vaporized gas by controlling a heater by means of a phase control, instead of controlling the heater by means of an on-off control which causes the vaporized gas to become a pulsating current, in a vaporized gas cooling apparatus using heater heating used in a thermal analysis apparatus and the like. By performing a phase control of the sine wave of the alternating power source by means of a thyristor and supplying power to the heater the duration of control at a time is reduced to as short as 10 msec (in case of 50 Hz). Accordingly, a filter effect is obtained by the fact that a changing speed of the heater temperature and a vaporization speed of coolant are too slow to follow the control action which prevents vaporized gas to become pulsating current. Since vaporized gas coming out is not a pulsating current, using this for cooling makes less fluctuation of temperature and makes the temperature more stable.

2 Claims, 2 Drawing Sheets

AUTOMATIC COOLING APPARATUS

BACKGROUND OF THE INVENTION

The invention relates to a cooling apparatus used in case of measurement in a low temperature range in a thermal analysis apparatus or a viscosity and elasticity measuring apparatus.

Systems of this kind which have been used up to now include a system making a temperature control by means of only a heating furnace while keeping a quantity of vaporized liquid nitrogen constant and a system making an on-off control of a heater in liquid nitrogen.

The above-mentioned prior arts have disadvantages such that a great amount of liquid nitrogen is consumed due to the necessity of keeping always an amount of vaporized liquid capable to attain the lowest temperature and pulsating current of nitrogen gas is caused by an on-off control action of the heater.

SUMMARY OF THE INVENTION

The invention, which has been developed to remove the above-mentioned disadvantages, comprises a heater power computing circuit, a comparator, a synchronizing pulse generating circuit, a clock pulse generating circuit, a summing circuit, and a thyristor as its main components.

Action of a system having the above-mentioned composition is described in the following. First, temperature of the heating furnace and a targeted temperature are inputted into the heater power computing circuit. The heater power computing circuit computes an electric power to be supplied to the heater and outputs the power value to one input side of the comparator. The synchronizing pulse generating circuit generates a pulse signal synchronized with the alternating power source, as shown in the signal waveform diagram of FIG. 2, and outputs the pulse signal as a reset signal of the summing circuit. The summing circuit counts clock pulses inputted from the clock pulse generating circuit after releasing a reset and outputs the result to the other input side of the comparator. The comparator compares the two input signals with each other and outputs a signal to turn on the thyristor at a point of time when values of the two signals coincide with each other. At this point of time, electric power is supplied to the heater and is left as it is in an on state until the alternating voltage becomes 0 volt according to characteristics of the thyristor. The heater when supplied with electric power, vaporizes a body of liquid nitrogen housed in a container, to produce a vapor. The container is coupled to the furnace in a manner which will allow the vapor to flow from the container to the furnace. The vapor flows from the container to the furnace to provide a cooling effect.

When the alternating voltage becomes 0 volt, the summing circuit is reset by an output signal of the synchronizing pulse generating circuit, sums up again clock pulses outputted from the clock pulse generating circuit from the beginning, and outputs the result to the one input side of the comparator. At a point of time when the output value of the heater power computing circuit and the value of the summing circuit coincide with each other, the comparator turns on the thyristor and the system begins supplying power to the heater and keeps supplying the power until the alternating voltage becomes 0 volt. The system repeats these operations.

In a word, since the heater power computing circuit outputs a phase signal and the system controls the heater by means of a phase control method, the system not only has a control action of vaporization of liquid nitrogen according to output of the heater power computing circuit but also an action of preventing pulsating current of vaporized nitrogen by shortening a control time for one time.

DETAILED DESCRIPTION

Figure 1:
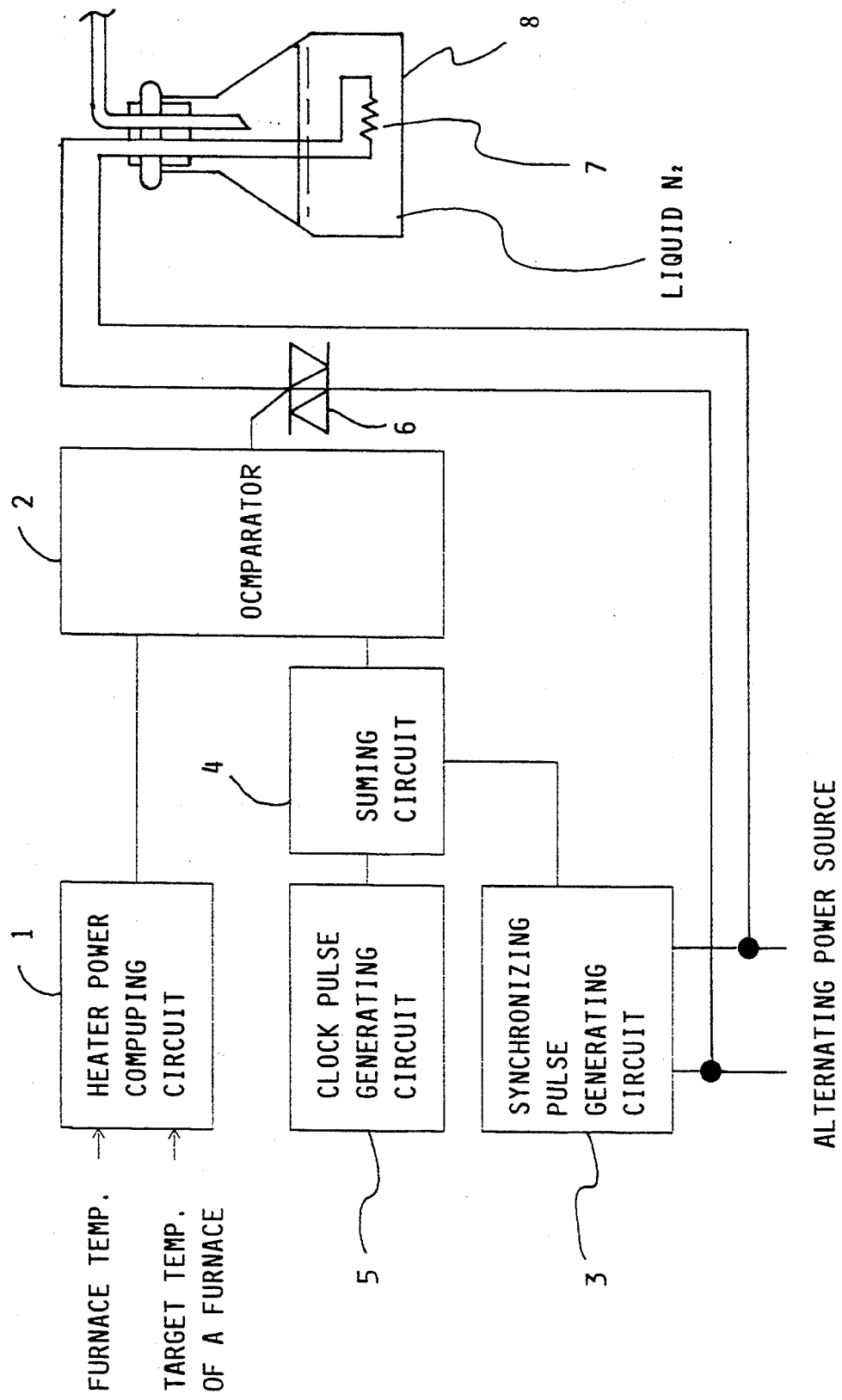
FIG. 1 is a block diagram showing the embodiment.
Figure 2A:
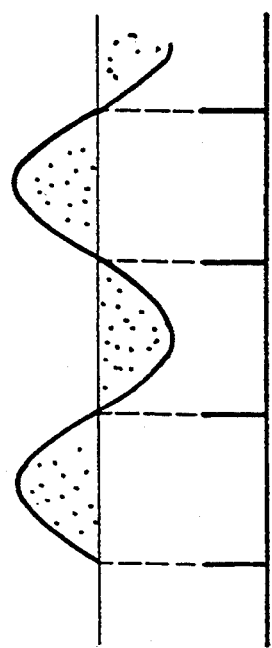
FIGS. 2a and 2b are timing charts showing each signal waveform of the embodiment.
Figure 2B:
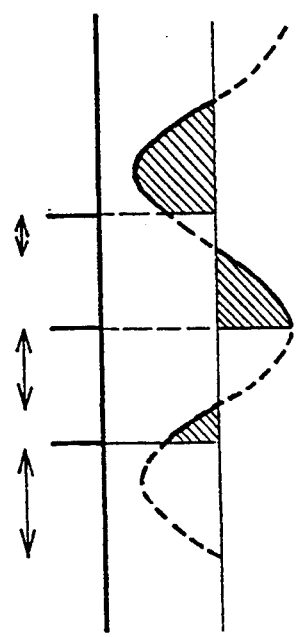

Referring to the drawings showing an embodiment of the invention, the invention is described in detail in the following. In FIG. 1, numberal 1 is a heater power computing circuit, into which temperature of a heating furnace and a targeted temperature of the heating furnace are inputted, computes power to be supplied to the heater, converts the power value into a phase value in a range of 0 to 1000, and outputs the phase value into one input side of a comparator 2. Numeral 4 is a summing circuit, which sums up clock pulses of 100 kHz outputted by a clock pulse generating circuit 5 from a point of time when a reset signal from a synchronizing pulse generating circuit 3 is released at a point of time when an alternating power source becomes 0 volt and the control operation enters the next cycle, and outputs the result into the other input side of the comparator 2. The comparator 2 compares these two input values with each other and turns on a thyristor 6 at a point of time when they coincide with each other to supply power to the heater 7. At this time, the thyristor 6 continues to be turned on until the alternating voltage becomes 0 volt once it is turned on according to its characteristics and the system keeps supplying power to the heater 7. The heater 7, when supplied with electric power, vaporizes a body of liquid nitrogen housed in a container 8, to produce a vapor. The container 8 is coupled to the furnace (not shown) in a manner which will allow the vapor to flow from the container to the furnace. The vapor flows from the container 8 to the furnace to provide a cooling effect.

When the alternating voltage comes near 0 volt, the synchronizing pulse generating circuit 3 resets the summing circuit 4 and the alternating power source enters the next cycle.

In the next cycle also, the system acts in the same manner as the above-mentioned process except that a phase in which an output value of the heater power computing circuit 1 coincides with an output value of the summing circuit 4 and the comparator 2 turns on the thyristor 6 from the previous cycle if an output value of the heater power computing circuit 1 has been changed, and after this the system repeats such operations and controls the heater by means of a phase control method.

Accordingly, since not only an amount of liquid nitrogen to be vaporized is controlled according to output of the heater power computing circuit but also the duration of control at a time is half a cycle of the alternating power source, namely, is as short as 10 msec in case of an alternating power source of 50 Hz, a filter effect obtained by a fact that a changing speed of the heater temperature and a vaporization speed of liquid nitrogen being too slow to follow the control action prevents vaporized nitrogen gas to become a pulsating current.

As described above, since the invention supplies coolant to a heating furnace according to output of a heater power computing circuit and furthermore without pulsating current, consumption of liquid nitrogen is made less and temperature of the heating furnace is made more stable to improve data when cooling a thermal analysis apparatus or a viscosity and elasticity apparatus.

Also the embodiment has been explained by means of digital circuits, however it is needless to say that another embodiment of the invention can be also composed of analog circuits, and in particular the heater power computing circuit can be replaced with a microprocessor and in a part of the heater power computing circuit where an electric power is converted into a phase the converting operation can be made by storing a conversion table in a memory.

What is claimed is:

1. An automatic cooling apparatus comprising:
   (a) a furnace;
   (b) a body of liquid material housed in a container wherein the container is coupled to the furnace such that gaseous matter may flow from said container to said furnace;
   (c) a heater power computing circuit which provides an output representative of the difference between an actual temperature of the furnace and a target temperature of the furnace;
   (d) a clock pulse generating circuit for providing a clock pulse at an output;
   (e) a summing circuit for summing clock pulses having an input coupled to the clock pulse generating circuit output and an output providing a summed value of clock pulses;
   (f) a synchronizing pulse generating circuit for generating a synchronizing pulse of an alternating power supply coupled to the summing circuit to reset the summing circuit at each pulse;
   (g) a comparator having a first input coupled to the heater power computing circuit output and a second input coupled to the summing circuit output and which produces an output signal at an output;
   (h) a heater, within said body of liquid material, for vaporizing said liquid material to produce a vapor which flows to said furnace for cooling said furnace;
   (i) a thyristor, having an input coupled to the comparator output, for providing power to the heater in response to the comparator output signal.

2. An automatic cooling apparatus of claim 1, wherein said liquid material is liquid nitrogen.

* * * * *